Feb. 18, 1969 J. KOSAR 3,428,208
DIRECT SEALS BETWEEN RECEPTACLES AND CLOSURES THEREFOR
Original Filed Jan. 7, 1965

INVENTOR.
JOHN KOSAR great# United States Patent Office 3,428,208
Patented Feb. 18, 1969

3,428,208
DIRECT SEALS BETWEEN RECEPTACLES
AND CLOSURES THEREFOR
John Kosar, % Anchor Engineering Co., 29—09 Bridge
Plaza N., Long Island City, N.Y. 11101
Continuation of application Ser. No. 423,950, Jan. 7,
1965. This application Apr. 10, 1967, Ser. No. 629,834
U.S. Cl. 220—39                                    18 Claims
Int. Cl. B65d 41/04

This application is a continuation of application S.N. 423,950, filed Jan. 1, 1965, and now abandoned, which was a continuation-in-part of application S.N. 278,384 filed May 6, 1963, now abandoned.

This invention relates to necked containers of either plastic, glass or sheetmetal, wherein their circular wall-ends defining the opening, are sealed direct by a cover or closure cap, i.e., without the use of a sealing disk or liner. The invention also relates to flange seals, pipe seals, pipe joints, oil seals and other mechanical seals wherein complementary cooperating configurations are urged into contact with each other to effect a seal therebetween.

The invention further relates to neckless receptacles such as bowls, tumblers which are covered and sealed by a lid. It also relates to non-circular boxes which are sealed by corresponding non-circular covers or lids. The material of bowls and tumblers may be glass, plastic or sheetmetal, while that of the non-circular boxes may be sheetmetal or plastic. The lids of the former and latter may be sheetmetal or plastic, i.e., sheetmetal lids may go with plastic receptacles or vice versa, glass receptacles go with plastic lids, and deformable plastic goes with a harder plastic, etc.

The principal object of the invention is to effect a direct seal between the container wall-end and closure cap or cover by having one sealing configuration in circular or non-circular wedging contact with the other and wherein one is capable of causing a slight resilient deformation or impression of and consequently a slight embedment with the other to thereby effect a seal therebetween as one is urged into contact with the other.

An additional object is to provide pairs of endless (circular or non-circular) sealing configurations wherein one configuration has at least one endless edge (or curved profile) and the other at least one endless flat (or curved) surface. Either one may be of a harder material than the other or both may be of a somewhat deformable material. A hard edge will bite into a soft surface and a soft edge will spread upon a hard surface, while both will deform upon each other if both are of a deformable material, when urged into contact with each other. In either case an effective seal is obtained.

Another object is to provide cooperating sealing configurations which are of simple construction and are capable of effecting a seal while urging a concentric alignment with each other as a result of said circular or noncircular wedging contact.

A further object is to provide sealing configurations which according to requirements form initially a one, two, three, four or more circular or non-circular line- or narrow surface-contacts.

Another object is to have the material of one cooperating configuration of a slightly softer material than that of the other. For instance, the material of a necked container may be polyethylene and that of the closure cap polystyrene or sheetmetal. On the other hand, the lid and bowl or box may each be of sheetmetal if no liquid-tight seal is required.

The closure cap or cover may be held in sealing contact with a necked container by means of a thread or thread lug-engagement with the container neck, while the lids or covers for bowls, tumblers and boxes may be held in sealing contact with the latter by means of a snap engagement with an exterior bulge at mouth edge of the latter. The air space in lid or closure cap situated between a two-edge sealing contact may be vacuumized in a vacuum chamber to assist in keeping the lid or closure firmly in contact with the receptacle.

Additional objects and features of the invention pertain to the particular structure and arrangements whereby the above objects are attained. Most of the sealing configurations illustrated for receptacles and closures may be reversed or inverted.

These and other objects, features and advantages of the present invention will become more readily apparent from the following description, reference being made to the accompanying drawings in which.

Figure 1:
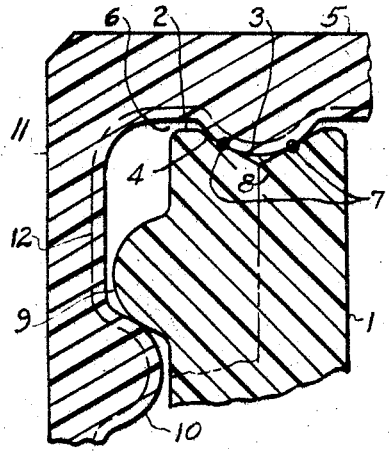
FIG. 1 is a sectional profile of a container neck which wall-end is shown in sealing engagement with a plastic closure cap and superimposed also by a sheetmetal cap.

A detailed description of the drawings follows herewith:

FIG. 1 illustrates the wall of 1 of a plastic container neck having in its end- or top-surface 2 an annular V-groove 3 which flanks are shown in initial wedging contact with an annular convex bead 4 of a closure cap or cover 5 which inside bottom on either side of bead is spaced from said top surface 2 to result in a clearance 6. The bead 4 makes an initial circular line-contact at 7 with both flanks of V-groove 3, and which lines, when the closure is pulled down develop into an annular surface contact as either the bead may slightly embed into the flanks of groove 3 or the reverse may be the case.

In the former the material of the closure cap may be polystyrene which is comparatively hard while the material of the container neck may be polyethylene or polyvinyl compound which is less hard and therefore slightly deformable. The void space 8 between apex of groove 3 and bottom of bead 4 may be vacuumized in the capping operation and which vacuum helps to maintain the bead in a firm sealing engagement with the flanks of V-groove 3. The material of the closure and container may both be polyethylene in which case both will deform slightly upon the other. In either of the (3) combinations of materials an effective seal may be obtained.

The thread 9 of container neck wall 1 is shown in engagement with thread 10 of skirt wall 11 of plastic closure cap 5 and these threads are the means for urging the bead 4 into firm sealing engagement with the flanks of groove 3. The inside contour of plastic closure may be that of a sheetmetal cap which outside contour is indicated by phantom line 12.

Figure 2:
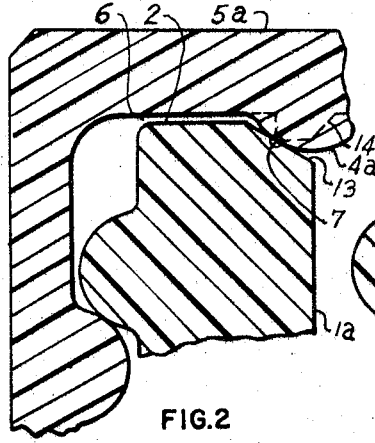
FIG. 2 is a sectional profile of a modification of FIG. 1.

FIG. 2 is similar to FIG. 1 except that the bead 4a of closure cap 5a is situated further inward in order to wedge with a bevel 13 at the I.D. of wall-end of plastic container wall 1a. The initial circular line contact is indicated at 7. The bevel 13 may instead be in contact with the square edge at 7 of projection 14 which is integral with the plastic cap 5a.

Figure 3:
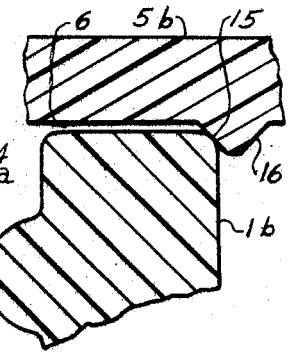
FIG. 3 is a sectional profile of a modification of FIG. 2.

FIG. 3 is similar to FIG. 2 except that the bevel at inner corner of wall-end of neck 1b is replaced by a rounded corner 15 which is engaged by the outer flank of a V-projection 16 of closure cap 5b.

Figure 4:
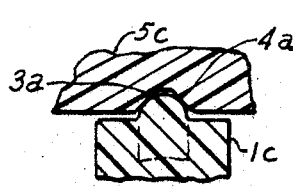
FIG. 4 is a sectional profile of the sealing features similar to that in FIG. 1 except inverted.

FIG. 4 is similar to FIG. 1 except reversed, i.e., the bead 4a projects from end of wall 1c while the V-groove 3a is formed in bottom of closure cap 5c. The thickness of wall 1c may be reduced as shown in phantom.

Figure 5:
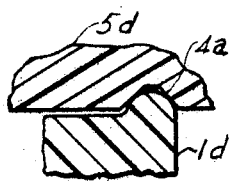
FIG. 5 is a sectional view of a modification of FIG. 4.

FIG. 5 is similar to FIG. 4 except that the bead projection 4a is shown flush with the I.D. of neck-wall 1d.

Figure 6:
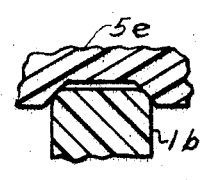
FIG. 6 is a sectional profile of a modification of FIG. 3.

FIG. 6 is similar to FIG. 3 except that both inner and outer rounded corners of end of wall 1b are each engaged by a flank formed by a truncated inverted V-groove of closure cap 5e.

Figure 7:
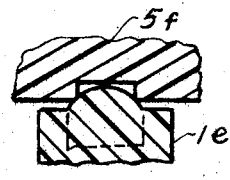
FIGS. 7–21 are sectional profiles of modified sealing configurations.

FIG. 7 is similar to FIG. 4 except that the bead or convex end of upright wall 1e is in wedging contact with both salient corners of a square cornered annular groove of closure or horizontal wall 5f.

Figure 8:
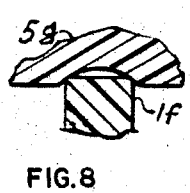

FIG. 8 illustrates a square cornered upright end of wall 1f in wedging contact with the surface of a concave groove in closure or horizontal wall 5g.

Figure 9:
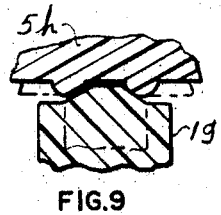

In FIG. 9 the upright wall 1g has an inverted truncated V-end, the flanks of which are in wedging contact with a pair of convex annular bead-projections of underside of opposing transverse wall 5h. The bottom of both beads may be flush with transverse wall as indicated by phantom. lines.

Figure 10:
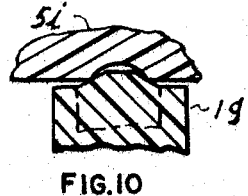

In FIG. 10 the end of upright wall 1g is similar to that in FIG. 9 except that the flanks of inverted truncated V-end are each in wedging contact with the corner of the terminal edges of a concave groove formed in opposing transverse wall 5i.

Figure 11:
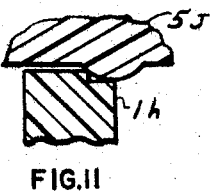

In FIG. 11 the inner top corner of upright wall 1h is provided with a step which two salient circular corners are both in contact with the surface of a convex annular bead in transverse wall or bottom of closure cap 5j.

Figure 12:
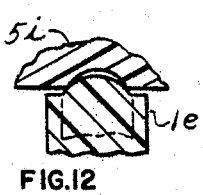

In FIG. 12 the upright wall 1e is similar to that in FIG. 7 while the upper or transverse wall 5i is similar to that in FIG. 10, i.e., the terminal edge of concave groove in transverse wall makes wedging contact with the convex end-surface of upright wall 1e.

Figure 13:
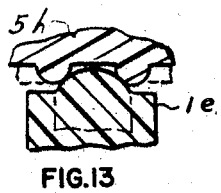

In FIG. 13 the configuration in upright wall 1e is similar to FIG. 12 while the transverse wall 5h is similar to that in FIG. 9, i.e., both sides of convex upper wall-end are in wedging contact with the inner surface of convex annular bead of transverse wall 5h.

Figure 14:
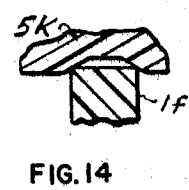

FIG. 14 is similar to FIG. 6 except that the flanks of truncated V-groove in transverse wall 5k are each in contact with a sharp top corner of upright wall 1f.

Figure 15:
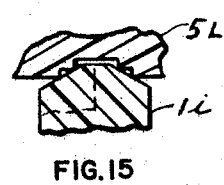

In FIG. 15 the top of upright wall 1i is similar to that in FIG. 10 except that both its flanks are in contact with the salient square corners formed by steps in transverse wall 5l and which steps are separated by a square annular recess in said transverse wall.

Figure 16:
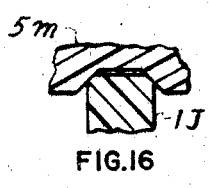

FIG. 16 is similar to FIG. 14 except that both corners of upright wall 1j are slightly beveled for wedging contact with the flanks of inverted truncated V-groove in transverse wall 5m.

Figure 17:

In FIG. 17 the top of upright wall 1k has an inverted V-contour which apex makes contact with the bottom of truncated V-groove in transverse wall 5n, while its lateral corners make contact with the flanks of said V-groove.

Figure 18:
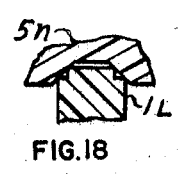

In FIG. 18 both end corners of upright wall 1l are provided with steps which salient corners are in wedging contact with the flanks of a truncated V-groove in horizontal wall 5n and which groove is similar to that in FIG. 16.

Figure 19:
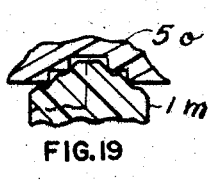

In FIG. 19 one or both corners of upright wall 1m are provided with laterally offset bevels which surfaces are each in wedging contact with the salient corner of a stepped recess in transverse wall 5o above.

Figure 20:
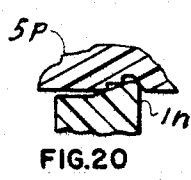

In FIG. 20 the inner corner of upright wall 1n extends upwardly to form a slightly rounded corner with the I.D. from where a sloping surface connects with a level surface of said wall. The slightly rounded corner at the I.D. of wall 1n is in wedging contact with the flank of a groove in transverse wall 5p while said sloping surface makes wedging contact with the salient corners of steps also formed in said transverse wall.

Figure 21:
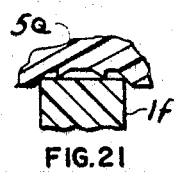

In FIG. 21 the flat top of upright wall 1f is in contact with spaced semi V-shaped projections of transverse wall 5q, while both corners of upright wall 1f are in wedging contact with the flanks of a V-recess of horizontal wall 5q.

In summarizing, the invention as illustrated in the various figures is characterized by pairs of opposing wall-surfaces. One of the surfaces being the mouth edge of a receptacle and the other being the peripheral portion of the transverse wall-surface of the inside bottom of a closure cap, lid or cover, while the central portion of said bottom serves to cover the mouth of said receptacle. Each of said opposing surfaces is provided with complementary configurations which cooperate to effect a seal therebetween so as to prevent escapement of liquid or gasses from within the receptacle or prevent them from entering it including impurities or contaminants. The opposing surfaces may be urged into sealing contact by a thread or thread-lugs in the depending wall of a closure cap in engagement with a mating thread or thread-lugs in side wall of the receptacle, or by interrupted lugs in a lid or cover in snap engagement with an exterior bulge or an inverted ledge around the mouth edge of side wall. The configurations in the pairs of opposing wall-surfaces must necessarily be endless and may follow a circular, elliptical, rectangular or polygonal path. The shape and form of the contacting elements of opposing configurations in side and transverse wall may be grouped as follows:

(1) Convex on bevel (FIGS. 1, 2, 3, 4, 5, 6 and 9)
(2) Convex on convex (FIG. 13)
(3) Edge on convex (FIGS. 7, 11 and 12)
(4) Edge on bevel (FIGS. 10, 14, 15, 16, 18 and 19)
(5) Edge on concave (FIG. 8)
(6) Edge on bevel plus edge on level surface (FIGS. 17 and 21)
(7) Edge on bevel plus convex on bevel (FIG. 20).

The number of contacting elements listed may be one or more and are arranged to provide for a lateral wedging action tending to urge the opposing configurations and their supporting walls into a concentric alignment as both walls are brought into a tight sealing engagement. In each case the initial contact of the elements of paired configurations forms either a line or edge contact, wherein the material of one element may be harder than the other so that a hard edge will tend to resiliently deform or bite into the softer element or the reverse may be the case in which a soft edge will deform on a rigid surface. On the other hand, both elements may be slightly deformable so that both will deform upon each other to thereby effect a seal.

In FIG. 17 the two lateral corners of upright wall to make contact (with upper configurations) in advance of its intermediate crest. The same applies to the (2) crests engaging the level surface of upright wall in FIG. 21. In FIG. 20 the rounded corner makes contact in advance of the stepped crests.

In FIG. 2, the bevel 13 may instead be slightly concave for contact by the edge of square corner of projection 14, at point 7.

I claim as my invention:

1. A device for effecting a direct seal between two opposing walls, comprising an annular side wall and a transverse top wall over said side wall, a container having an opening defined by said side wall terminating in a top surface forming a pair of corner portions, a closure cap having said top wall and a peripheral skirt depending therefrom, said skirt surrounding the uppermost portion of said side wall, and said top wall covering said opening and said top surface, the inner face of said top wall being provided with an annular recess forming a pair of flank portions for sealing engagement with said corner portions, at least one of said opposing walls being resiliently deformable by the other, and thread means within said skirt and said side wall for urging said walls toward each other to thereby effect a seal between said corner portions and said flank portions.

2. The device as in claim 1 wherein both corner portions of said top surface are provided with an edge and wherein said top wall is provided with a truncated V-shaped recess which flanks form a pair of bevels for sealing engagement with said edges.

3. The device as in claim 2 wherein said top wall is provided with an arcuate recess which lateral surfaces are in sealing contact with the pair of edges of said top surface.

4. The device as in claim 2 wherein the bottom of said truncated V-groove is provided with a pair of semi V-projections having their sloping flanks facing each other and tending to divert upon contact with said top surface following the contact of said pair of edges with the flanks of said V-groove.

5. The device as in claim 2 wherein both edges of said top surface are rounded for sealing engagement with the flanks of said V-groove.

6. The device as in claim 5 wherein at least one flank of said V-groove is in wedging sealing contact with one of the rounded edges of said top surface.

7. The device as in claim 1 wherein both corner portions of said top surface are provided with a bevel, and wherein said top wall is provided with a generally square cornered recess forming a pair of flanks which exposed edges are in sealing engagement with said pair of bevels.

8. The device as in claim 7 wherein both flanks of said recess are each provided with at least one lateral offset resulting in at least one pair of edges for sealing engagement with each of said pair of bevels.

9. The device as in claim 7 wherein both bevels of said top surface are each provided with at least one lateral offset, each offset forming a female corner, and wherein the exposed flank edges of said square cornered recess are each in sealing contact with one of said bevels above said offset for optional sealing engagement with said female corner.

10. The device as in claim 1 wherein both corner portions of said top surface are provided with a bevel, and said top wall provided with an arcuate recess forming a pair of exposed terminal edges for sealing engagement with said bevels.

11. The device as in claim 1 wherein both corner portions of said top surface are provided with a bevel, and said top wall provided with a recess which flanks are convexly rounded for sealing engagement with said bevels.

12. The device as in claim 1 wherein both corner portions of said top surface are provided with a bevel, and said top wall provided with a truncated V-groove which flanks are in sealing engagement with said bevels.

13. The device as in claim 1 wherein both corner portions of said top surface are provided with a bevel which flanks converge to form a medial top edge and a pair of lateral edges at the intersection with both lateral surfaces of said side wall, and said top wall being provided with a truncated V-groove which bottom makes contact with said top edge while its flanks make contact with said lateral edges.

14. The device as in claim 1 wherein said top surface is at least partly upwardly inclined to intersect and form a rounded edge with one of the sides of said side wall and wherein said top wall is provided with a recess having at one of its sides a bevel for engagement of said rounded edge while the other portion of said recess is provided with at least one generally square cornered step forming an edge for engagement of the inclined portion of said top surface.

15. The device as in claim 1 wherein both corner portions of said top surface are provided with a cut-out forming a pair of edges at each corner, and said top wall being provided with a truncated V-groove forming a pair of flanks for engagement of both pairs of said edges.

16. The device as in claim 1 wherein top surface is provided with a pair of convexly curved corner portions and said top wall provided with a truncated V-groove which flanks are in sealing contact with both lateral upper sides of said curved corner portions.

17. The device as in claim 16 wherein said top wall is provided with a recess forming a pair of exposed edges for sealing contact with both lateral upper sides of said curved corner portions.

18. The device as in claim 16 wherein said top wall is provided with a recess which exposed flank edges are convexly rounded for sealing engagement with both lateral upper sides of said curved corner portions.

References Cited

UNITED STATES PATENTS

| | | |
|---|---|---|
| 2,818,204 | 12/1953 | Henchert et al. |
| 2,828,789 | 4/1958 | Groendyk et al. |
| 2,950,033 | 8/1960 | Henchert. |
| 2,979,218 | 4/1961 | Stover. |
| 3,034,579 | 1/1963 | Miller. |

FOREIGN PATENTS

| | | |
|---|---|---|
| 782,574 | 9/1957 | Great Britain. |
| 696,690 | 8/1953 | Great Britain. |

JAMES B. MARBERT, *Primary Examiner.*